United States Patent
Angerer et al.

(10) Patent No.: US 8,645,937 B2
(45) Date of Patent: Feb. 4, 2014

(54) PHOTOVOLTAIC PLANT HAVING A PLURALITY OF INVERTERS, INVERTER, USB MASS STORAGE DEVICE AND METHOD FOR CARRYING OUT SOFTWARE UPDATES ON INVERTERS

(75) Inventors: Christian Angerer, Linz (AT); Alexander Zorn, Kirchdorf/Krems (AT); Harald Josef Kreuzer, Weisskirchen (AT); Joachim Danmayr, Nussbach (AT)

(73) Assignee: Fronius International GmbH, Pettenbach (AT)

( * ) Notice: Subject to any disclaimer, the term of this patent is extended or adjusted under 35 U.S.C. 154(b) by 381 days.

(21) Appl. No.: 13/138,243

(22) PCT Filed: Jan. 18, 2010

(86) PCT No.: PCT/AT2010/000013
§ 371 (c)(1),
(2), (4) Date: Jul. 22, 2011

(87) PCT Pub. No.: WO2010/091444
PCT Pub. Date: Aug. 19, 2010

(65) Prior Publication Data
US 2011/0283272 A1    Nov. 17, 2011

(30) Foreign Application Priority Data
Feb. 12, 2009 (AT) .................................. A 242/2009

(51) Int. Cl.
*G06F 9/44* (2006.01)
(52) U.S. Cl.
USPC .......................................................... 717/168
(58) Field of Classification Search
USPC .......................................................... 717/168
See application file for complete search history.

(56) References Cited

U.S. PATENT DOCUMENTS 6,357,021 B1    3/2002  Kitagawa et al.
8,456,877 B2 *  6/2013  Angerer et al. ................. 363/95

(Continued)

FOREIGN PATENT DOCUMENTS

AT          501 846       11/2006
CN         201063560       5/2008

(Continued)

OTHER PUBLICATIONS

Kadir et al. "Embedded Control with Predictive Diagnostics Algorithm of the Induction Machine Drive System", 2006, IEEE.*

(Continued)

*Primary Examiner* — Wei Zhen
*Assistant Examiner* — Junchun Wu
(74) *Attorney, Agent, or Firm* — Collard & Roe, P.C.

(57) ABSTRACT

The invention relates to a photovoltaic plant having a plurality of inverters (1) connected to each other by way of a network (12), wherein the inverters (1) comprise a control apparatus (7) having at least one microprocessor (8) and at least one storage, an interface for communicating with the remaining inverters (1), a DC/AC module (3) for converting a direct current supplied from an external energy source into an alternating current, and an input/output unit (9), and to such an inverter (1) and a USB mass storage device (11), as well as to a method for carrying out software updates. According to the invention, a USB interface (10) is arranged on at least one inverter (1) for connecting a USB mass storage device (11), in particular a USB stick, so as to carry out automatic updates in a software running in the microprocessor (8) and/or configuration block updates and/or so as to record logging data of the inverters.

6 Claims, 2 Drawing Sheets

(56) References Cited

U.S. PATENT DOCUMENTS

Figure 1:
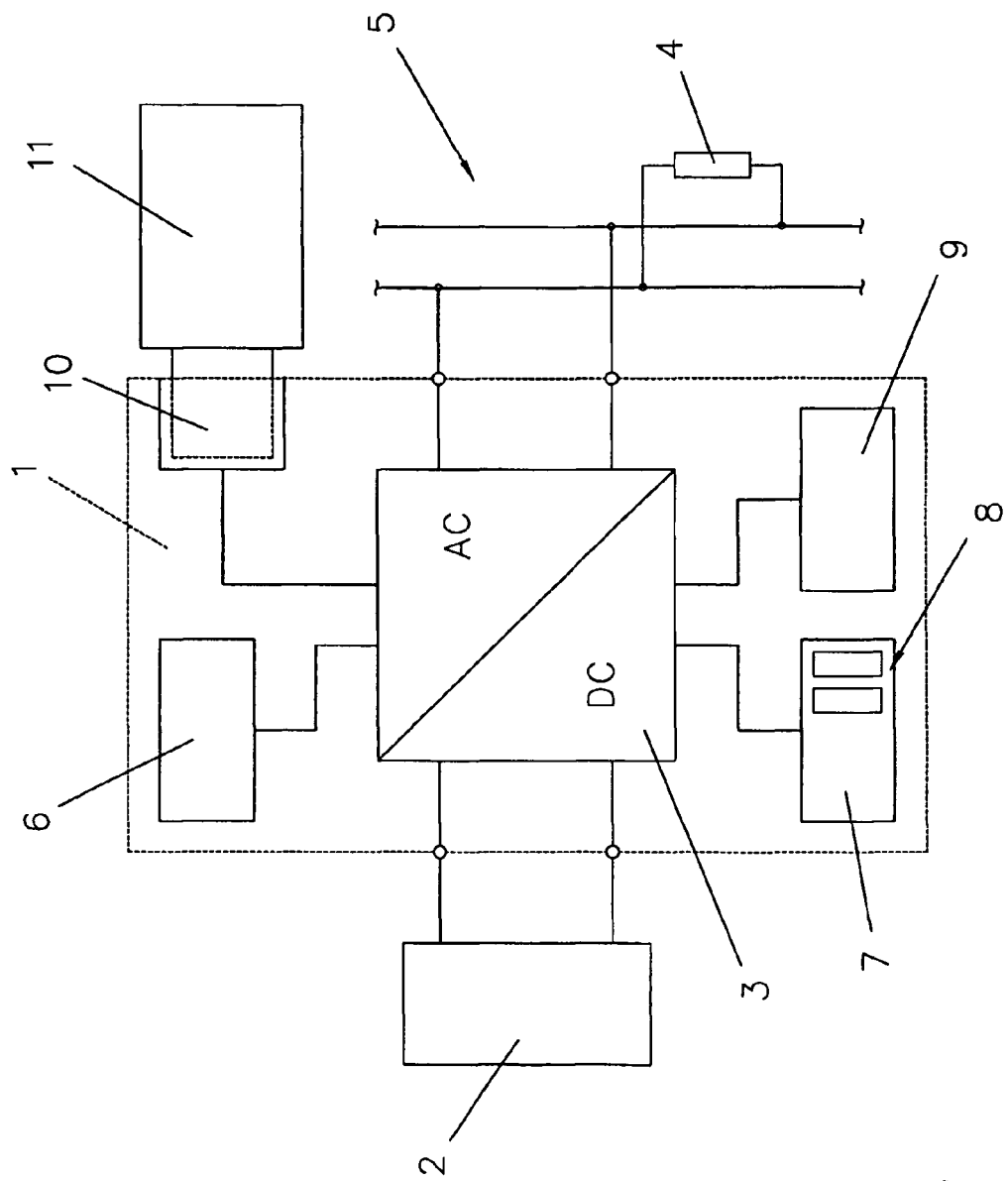

2007/0252716 A1* 11/2007 Burger .................... 340/635
2012/0173766 A1* 7/2012 Yoshimura ................. 710/8

FOREIGN PATENT DOCUMENTS

| CN | 201075719 | 6/2008 |
| DE | 203 16 091 | 2/2004 |
| DE | 10 2004 025 923 | 12/2005 |
| WO | WO 2005/117245 | 12/2005 |
| WO | WO 2006/086809 | 8/2006 |
| WO | WO 2006086809 A1 * | 8/2006 |
| WO | WO 2008/125915 | 10/2008 |

OTHER PUBLICATIONS

International Search Report of PCT/AT2010/000013, Sep. 14, 2010.
Austrian Office Action dated Sep. 22, 2009 in Austrian Application No. A 242/2009, with an English translation of the relevant parts.

* cited by examiner

PHOTOVOLTAIC PLANT HAVING A PLURALITY OF INVERTERS, INVERTER, USB MASS STORAGE DEVICE AND METHOD FOR CARRYING OUT SOFTWARE UPDATES ON INVERTERS

CROSS REFERENCE TO RELATED APPLICATIONS

This application is the National Stage of PCT/AT2010/000013 filed on Jan. 18, 2010, which claims priority under 35 U.S.C. §119 of Austrian Application No. A 242/2009 filed on Feb. 12, 2009, the disclosure of which is incorporated by reference. The international application under PCT article 21(2) was not published in English.

The invention relates to a photovoltaic plant having a plurality of inverters connected to each other by means of a network, wherein the inverters comprise a control apparatus having at least one microprocessor and at least one storage, an interface for communicating with the remaining inverters, a DC/AC module for converting a direct current supplied from an external energy source into an alternating current, and an input/output unit.

Furthermore, the invention relates to an inverter comprising a control apparatus having at least one microprocessor and at least one storage, an interface for communicating with the remaining inverters, a DC/AC module for converting a direct current supplied from an external energy source into an alternating current, and an input/output unit.

The invention further relates to a USB mass storage device comprising a USB interface and storage elements for receiving and storing data and software for an inverter.

Finally, the invention relates to a method for performing software updates on one of a plurality of inverters connected to each other by means of a network.

The present invention relates to inverters, in particular network-coupled inverters or stand-alone inverters converting direct current of an energy source into alternating current. In the case of stand-alone inverters, alternating current is produced from the direct current of a battery or solar cell, so that it is possible to operate normal electrical household appliances even far away from the mains power supply. In the case of network-coupled inverters, the energy from a direct current source is also converted into alternating current that is, however, fed into an existing mains power supply.

Usual inverters comprise one or a plurality of microprocessors or microcontrollers, respectively, which execute particular programs, for instance, for flow control, operating control, control in the case of erroneous function, detection of the battery state, or for menu navigation.

Due to further developments of the devices and/or modifications of the operating situation, the programs running in the microprocessors or microcontrollers, respectively, and/or the corresponding software are frequently modified. The installing of a new software, a so-called software update, presently involves relatively high effort. This is further aggravated by the fact that no energy supply exists in the control device whose software is to be updated. Thus, it is, for instance, necessary to go, with a portable computer that is provided with a voltage supply, to the place where the inverter is positioned and to instal the new software there.

Another possibility consists in connecting a device that was developed exclusively for this software update to an interface of the inverter which is provided for this very purpose, so that an automatic software update is started.

AT 501 846 B1, for instance, discloses a device and a method for performing software updates in inverters without a permanent own electrical energy supply. The inverter comprises interfaces for communicating with microprocessors contained therein, and a so-called update device enabling a particularly simple and quick updating of the software, even in inverters without energy source. For this purpose, at least one storage is provided which comprises the software to be installed, a voltage source, at least one interface for communicating with the communication interface of the inverter, at least one connection connected with the voltage source for communicating with a connection for the external energy supply of the microprocessors of the inverter, and furthermore a unit for controlling the transfer of the software from the storage to the microprocessor of the inverter. Furthermore, a storage of the update device comprising an interface for reading/writing the storage content may be provided. It is possible to install a new software in the update device via this interface. Preferably, this interface is a standardized interface, for instance a USB (Universal Serial Bus) interface or the like.

It is a disadvantage that the USB interface is merely arranged at the update device for installing the software, and that another interface is required for connecting the update device with the inverter, via which the software update on the inverter is then performed.

Furthermore, U.S. Pat. No. 6,357,021 B1 discloses a method and a device for updating the software of an arbitrary peripheral device that is supplied with current during the updating process. The communication with a computer takes in particular place via a USB interface.

The term "software" in particular includes a so-called firmware, i.e. the software that is embedded in a microprocessor or microcontroller of a corresponding electronic device and that is stored in a program memory such as a flash memory or EEPROM, respectively. The firmware is usually provided by the manufacturer along with the electronic device and is not visible for the user of the device and comprises various functions for controlling the device.

The object of the present invention therefore consists in providing a photovoltaic plant, an inverter, a USB mass storage device, and a method for carrying out software updates on an inverter, by which a simplification of handling is enabled. Disadvantages of known systems are intended to be avoided and/or reduced by the present invention.

The object of the present invention is solved by an above-mentioned photovoltaic plant, wherein a USB interface is arranged on at least one inverter for connecting a USB mass storage device, in particular a USB stick, so as to carry out automatic updates in a software running in the microprocessor and/or configuration block updates and/or so as to record logging data of the inverters.

Furthermore, the object of the invention is solved by an inverter in which a USB interface is provided for connecting a USB mass storage device, in particular a USB stick, so as to carry out automatic updates in a software running in the microprocessor and/or configuration block updates and/or so as to record logging data of the inverter.

Moreover, the object of the invention is solved by a USB mass storage device, wherein the USB interface is designed to be connected to a USB interface arranged at the inverter, and to carry out automatic updates in a software running in a microprocessor of the inverter and/or configuration block updates and/or to record logging data of the inverter.

The object of the invention is also solved by a method for carrying out software updates on one of a plurality of inverters connected to each other by means of a network, wherein at least one inverter with a USB interface is connected with a USB mass storage device so as to carry out automatic updates in a software running in a microprocessor of the inverter and/or configuration block updates and/or so as to record logging data of the inverter, wherein the inverter connected with the USB mass storage device automatically assumes the function of a master in the network.

It is of advantage that standardized components may be used and hence the costs may be reduced substantially. The handling is improved since the use of known components is easy for the users. By a simple plugging of the USB mass storage device, the user automatically carries out the software update of the operating system for the microprocessors or of other data without having to perform any further adjustments and/or controls. Advantageously, the selection of the most recent software for the currently available hardware (inverter and microprocessors contained therein) is performed automatically, so that a selection by the user may be omitted and hence errors and possible damages to the hardware are avoided. Furthermore, the mutual compatibility of the individual software components of the individual microprocessors may be examined.

Moreover, the automatic detection may also enable the selection of the configuration block specific for the respective country and/or limit values and specifications of the energy provider, so that their observance is ensured. Important setting parameters of the inverters may be maintained with these procedures so as to be able to ensure the required valid provisions and standards and/or technical guidelines, e.g. the limit values of the supply voltage, even after the update. Likewise, parameters or information which are primarily of interest for the customer only, for instance, the operating hours, may be maintained.

Another advantage consists in the possibility of the encryption of the software and/or of the configuration block, so that a manipulation by unauthorized persons is substantially aggravated.

Further details and measures for the method may be taken from the following description.

Figure 2:
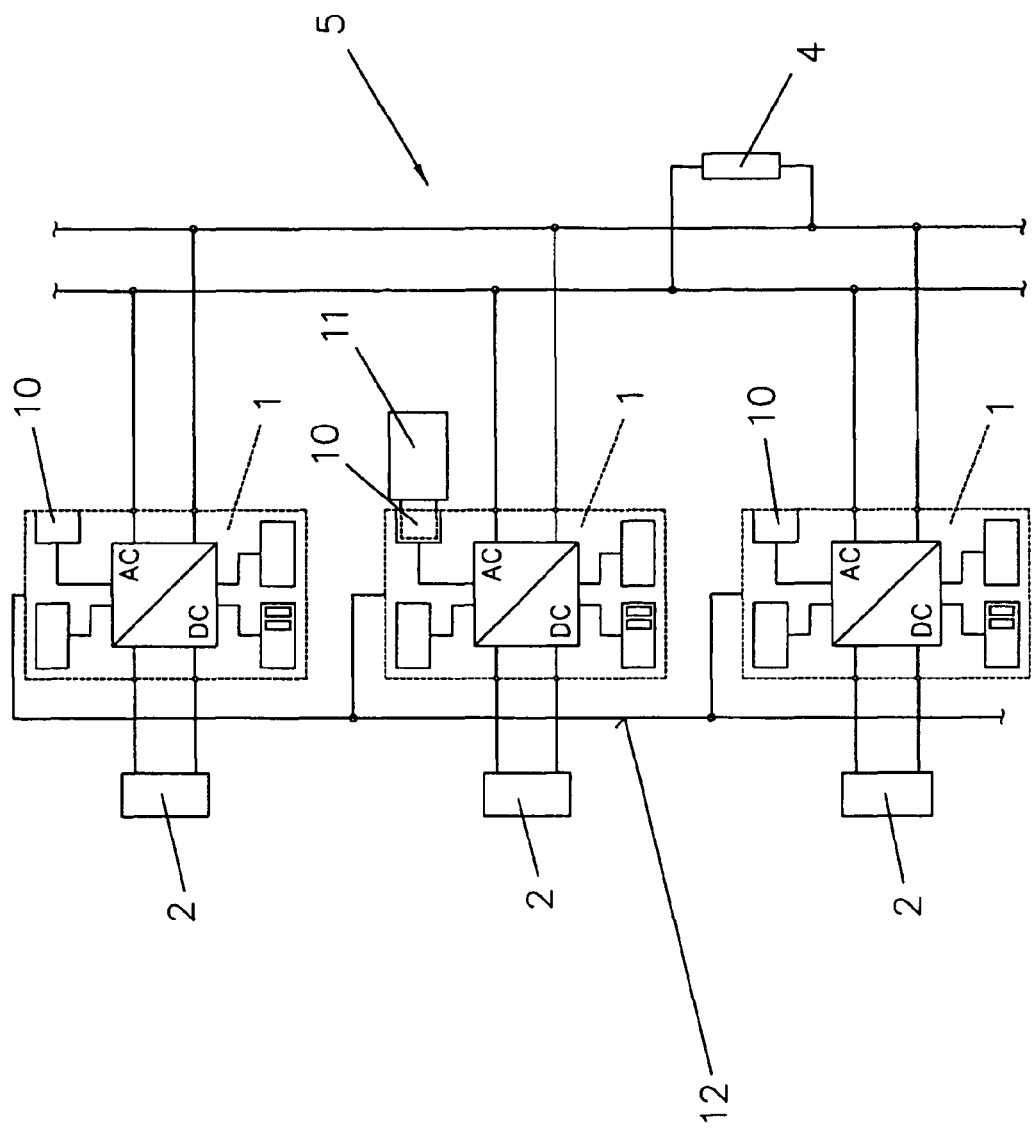

The present invention will be explained in detail by means of the enclosed drawing. There show:

FIG. 1 a block diagram of an inverter with microprocessors and a USB interface; and FIG. 2 a block diagram of a photovoltaic plant with a plurality of inverters in a simplified schematic illustration.

FIG. 1 shows a block diagram of an inverter 1 supplying from a direct current supplied from a battery or another external energy source, e.g. a solar module 2, an alternating current of usually 230 V by means of a DC/AC module 3. This alternating current serves to supply various loads 4, as is usual with stand-alone inverters, or to be coupled into an existing mains power supply 5 in the case of network-coupled inverters 1.

The inverter 1 comprises a power supply unit 6 supplying all components with electrical energy. Furthermore, a control apparatus 7 is provided which may comprise various microprocessors 8 which execute programs that may, for instance, serve for flow control, operating control of error monitoring, the monitoring of the battery condition and/or the solar modules 2 and/or the menu navigation. Finally, an input/output unit 9 may be provided via which the different operating conditions of the inverter 1 may be displayed or parameters may be input.

In order to modify the software running in the microprocessors 8 of the inverter 1, the inverter 1 comprises a USB interface 10. The inverter 1 may comprise further interfaces such as a serial RS 232 interface, one or several further USB interfaces, or the like.

By means of the USB interface 10 mentioned, a USB mass storage device 11, in particular a so-called USB stick, may be connected with the inverter 1, as is illustrated schematically in FIG. 1. If the inverter 1 detects a new USB mass storage device 11 that is connected with the USB interface 10, the inverter 11 automatically starts searching for an update file. If a valid update file is found, the inverter 1 preferably autonomously starts selecting the suitable software from the update file and carrying out an update of the software in the microprocessor 8 of the inverter 1.

As a matter of course, it is possible that the inverter, after detecting the presence of a USB mass storage device 11, waits for a decision or confirmation of the user whether to carry out an update or not. In this case, there may be displayed, for instance, at the display of the input/output unit 9 of the inverter 1, that a new software update is available. By actuating a push button at the input/output unit 9, the user may start the software update.

The update process may comprise both the software and the configuration blocks and/or both, wherein these processes are independent of each other. Accordingly, a configuration block update may be carried out without the software being modified, and vice versa. After a successful update process, the inverter 1 programs itself autonomously with the new software in that, for instance, a reboot of the inverter 1 is automatically performed and the new software and/or the modified files is/are accessed during the rebooting of the inverter 1.

After the starting of the inverter 1, the inverter 1 reads the configuration blocks that were copied by the mass storage device 11 into a non-volatile memory. One of these configurations may now be selected at the inverter as needed. Thus, the configuration block selection is dynamic and independent of the available software version of the device.

By using a so-called update group indicator, an update may also be restricted to specific configurations complying with valid provisions, standards and/or technical guidelines.

Preferably, in a photovoltaic plant a plurality of inverters 1 are nowadays connected with each other by means of a network 12. The inverters 1 switched in parallel supply the converted energy, for instance, to the mains power supply 5, as is schematically illustrated in FIG. 2. Preferably, all inverters 1 have the same construction and are each provided with an integrated USB interface 10. If several inverters 1 are linked with each other, the inverter 1 that is connected with a USB mass storage device 11 automatically assumes the function of a master in the network 12. The user may thus plug the USB stick or the USB mass storage device 11, respectively, to any inverter 1 of the system, which subsequently acts as a master. This inverter 1 may distribute the data available in the USB mass storage device 11 also to all remaining inverters 1 in the network 12 and update their software and configuration blocks in the same manner. By the plugging of the USB mass storage device 11 to the USB interface 10 of an inverter 1, a modification of the master is performed, so that the inverter 1 with the plugged USB stick has all possibilities available in communicating with the remaining inverters 1, i.e. this inverter 1 obtains any rights. Thus, it is also possible that this inverter 1 carries out a corresponding software update via the network 12 by means of which all inverters 1 are connected with each other. Preferably, however, first of all the inverter 1 is updated into which the USB stick is plugged, before the remaining inverters 1 are updated one after the other or simultaneously.

Furthermore, the USB mass storage device 11 connected to the inverter 1 may serve as a storage for logging data. In so doing, the data detected by the inverter 1 are recorded at the USB mass storage device 11. If the inverter 1 is in a network 12 of a plurality of inverters 1, the inverter 1 that is connected with the USB mass storage device 11 again assumes the master function and may request the measurement data of the other devices or inverters 1, respectively, and store them in the USB mass storage device 11.

If another master, for instance, a fixedly defined master inverter 1, is integrated in the network 12, it may also request data from the USB mass storage device 11. The fixedly defined master inverter 1 may therefore access the USB mass storage device 12 via the network 12 and the inverter 1 into which the USB stick is plugged. Thus, this fixedly defined master inverter 1 may, for instance, transfer the data of the USB mass storage device 11 via the network 12 to a personal computer or assign data from a personal computer to the USB stick at another inverter 1 and store same.

The invention claimed is:

1. A photovoltaic plant having a plurality of inverters (1) connected to each other by means of a network (12), wherein the inverters (1) comprise a control apparatus (7) having at least one microprocessor (8) and at least one storage, an interface for communicating with the remaining inverters (1), a DC/AC module (3) for converting a direct current supplied from an external energy source into an alternating current, and an input/output unit (9), wherein a USB interface (10) is arranged on at least one inverter (1) for connecting a USB mass storage device (11), in particular a USB stick, so as to carry out automatic updates in a software running in the microprocessor (8) and/or configuration block updates and/or so as to record logging data of the inverters (1), wherein the inverter (1) connected with the USB mass storage device (11) is designed for automatically assuming the function of a master in the network (12), so that the data available in the USB mass storage device (11) are adapted to be distributed also to all remaining inverters (1) in the network (12) and the software and configuration blocks thereof are adapted to be updated in the same manner.

2. The photovoltaic plant according to claim 1, wherein means are provided for encrypting the data transmitted between the USB mass storage device (11) and the inverter (1).

3. An inverter (1) for a photovoltaic plant according to claim 1, comprising a control apparatus (7) having at least one microprocessor (8) and at least one storage, an interface for communicating with the remaining inverters (1), a DC/AC module (3) for converting a direct current supplied from an external energy source into an alternating current, and an input/output unit (9), wherein a USB interface (10) is provided for connecting a USB mass storage device (11), in particular a USB stick, so as to carry out automatic updates in a software running in the microprocessor (8) and/or configuration block updates and/or so as to record logging data of the inverter (1), wherein with the connection of an USB mass storage device (11) to the USB interface the inverter (1) is designed for automatically assuming the function of a master in the network (12), so that the data available in the USB mass storage device (11) are adapted to be distributed also to all remaining inverters (1) in the network (12) and the software and configuration blocks thereof are adapted to be updated in the same manner.

4. A method for performing software updates on one of a plurality of inverters of a photovoltaic plant according to claim 1 which are connected to each other by means of a network (12), wherein at least one inverter (1) with a USB interface (10) is connected with a USB mass storage device (11) so as to carry out automatic updates in a software running in a microprocessor (8) of the inverter (1) and/or configuration block updates and/or so as to record logging data of the inverter (1), wherein the inverter (1) connected with the USB mass storage device (11) automatically assumes the function of a master in the network (12) and the data available in the USB mass storage device (11) are distributed also to all remaining inverters (1) in the network (12) and the software and configuration blocks thereof are updated in the same manner.

5. The method according to claim 4, wherein the data transmitted between the USB mass storage device (12) and the inverter (1) are encrypted so as to protect them from manipulation.

6. The method according to claim 4, wherein the data suitable for the respective inverter (1) are automatically selected from the data stored in the USB mass storage device (11).

* * * * *